United States Patent
Ito

(10) Patent No.: US 10,457,575 B2
(45) Date of Patent: Oct. 29, 2019

(54) HYDROGEN WATER GENERATOR

(71) Applicant: FUJI KEIKI CO., LTD., Kushiro-shi, Hokkaido (JP)

(72) Inventor: Masashi Ito, Kushiro (JP)

(73) Assignee: FUJI KEIKI CO., LTD., Kushiro-Shi, Hokkaido (JP)

( * ) Notice: Subject to any disclaimer, the term of this patent is extended or adjusted under 35 U.S.C. 154(b) by 158 days.

(21) Appl. No.: 15/309,708

(22) PCT Filed: Dec. 9, 2015

(86) PCT No.: PCT/JP2015/084493
§ 371 (c)(1),
(2) Date: Nov. 8, 2016

(87) PCT Pub. No.: WO2017/098598
PCT Pub. Date: Jun. 15, 2017

(65) Prior Publication Data
US 2017/0166460 A1    Jun. 15, 2017

(51) Int. Cl.
*C02F 1/461* (2006.01)
*C02F 103/02* (2006.01)

(52) U.S. Cl.
CPC ........ *C02F 1/46109* (2013.01); *C02F 1/4618* (2013.01); *C02F 2001/4619* (2013.01);
(Continued)

(58) Field of Classification Search
CPC ................ C02F 1/46109; C02F 1/4618; C02F 2001/4619; C02F 2201/46105;
(Continued)

(56) References Cited

U.S. PATENT DOCUMENTS

2009/0314651 A1* 12/2009 Field ...................... A47L 13/26
205/335
2016/0236955 A1*  8/2016 Luo ......................... C25B 11/03

FOREIGN PATENT DOCUMENTS

JP          3068364 U  *  5/2000
JP          3068364 U      5/2000
(Continued)

OTHER PUBLICATIONS

PCT, "International Search Report for International Application No. PCT/JP2014/060772".

*Primary Examiner* — Nicholas A Smith
(74) *Attorney, Agent, or Firm* — Manabu Kanesaka

(57) ABSTRACT

The present invention provides a hydrogen water generator capable of efficiently generating hydrogen with a structure in which anode electrode(s) and cathode electrode(s) are arranged in a container in an approximately vertical direction. The electrode portion 4 which includes two or more of anode electrodes 4A or cathode electrodes 4B is supported by a generator body cover portion 2. The generator body cover portion 2 is held and the electrode portion 4 is immersed in drinking water in a beverage container 12 such as a cup. Then, electrolysis is caused owing to that a controller 11 applies voltage obtained by boosting supply voltage from a battery 8 to the electrode portion 4 for a predetermined time. At this time, since a plurality of energizing paths between the anode electrode(s) and the cathode electrode(s) are formed, hydrogen can be effectively generated in the drinking water.

8 Claims, 9 Drawing Sheets

(52) U.S. Cl.
CPC ............ *C02F 2001/46133* (2013.01); *C02F 2001/46152* (2013.01); *C02F 2103/02* (2013.01); *C02F 2201/4615* (2013.01); *C02F 2201/46105* (2013.01); *C02F 2201/46135* (2013.01); *C02F 2201/46165* (2013.01); *C02F 2307/02* (2013.01)

(58) Field of Classification Search
CPC .... C02F 2201/46135; C02F 2201/4615; C02F 2201/46165; C02F 2307/02
See application file for complete search history.

(56) References Cited

FOREIGN PATENT DOCUMENTS

| | | | |
|---|---|---|---|
| JP | 2001-000971 A | | 1/2001 |
| JP | 2001000971 A | * | 1/2001 |
| JP | 2003-181471 A | | 7/2003 |
| JP | 2012-007206 A | | 1/2012 |
| JP | 2014-014645 A | | 1/2014 |
| JP | 2014014645 A | * | 1/2014 |
| JP | 2014-226575 A | | 12/2014 |
| JP | 3195995 U | | 2/2015 |
| JP | 3199998 U | | 10/2015 |

* cited by examiner

FIG. 8

| Number of electrodes | Hydrogen concentration (ppb) |
|---|---|
| Two | 800~1000 |
| Three | 1000~1200 |
| Four | 1200~1400 |
| Five | 1500~1600 |

HYDROGEN WATER GENERATOR

RELATED APPLICATIONS

The present application is National Phase of International Application No. PCT/JP2015/084493 filed Dec. 9, 2015, the disclosure of which is hereby incorporated by reference herein in its entirety.

TECHNICAL FIELD

The present invention relates to a hydrogen water generator which generates hydrogen water by generating hydrogen through electrolysis in drinking water stored in a beverage container.

BACKGROUND ART

Recently, clinical results and experimental results of research institutions have established that active oxygen is neutralized by consuming hydrogen water with a certain concentration, leading to promotion of health. Accordingly, hydrogen water enclosed in a container such as an aluminum bottle or a plastic bottle and a tablet which generates hydrogen in water has been commercially available so that hydrogen water can be frequently consumed.

Instead of such a ready-made product, a hydrogen water generator for generating hydrogen water through electrolysis has been known in which an anode electrode plate and a cathode plate are arranged as being vertically aligned in a beverage container capable of containing drinking water so that a user can easily generate hydrogen water (for example, see Patent Literature 1).

Further, a hydrogen water generator in which an anode plate and a cathode plate are arranged approximately horizontally in a beverage container has been known (for example, see Patent Literature 2).

CITATION LIST

Patent Literature

Patent Literature 1: Japanese Registered Utility Model No. 3195995
Patent Literature 2: Japanese Patent Application Laid-Open No. 2014-226575

SUMMARY OF THE INVENTION

In the hydrogen water generator disclosed in Patent Literature 1, hydrogen water is generated through electrolysis as vertically inserting an anode electrode and a cathode electrode through a mouth portion at an upper part of the beverage container. Accordingly, bubbles of hydrogen generated at a lower part of the cathode electrode coalesce with bubbles generated at an upper part thereof and diameters of the bubbles are enlarged while rising along the cathode electrode. Since the bubbles of hydrogen are emitted from electrolyzed water in a short time as the diameters thereof are enlarged, there is a defect that hydrogen concentration of the electrolyzed water falls.

On the other hand, in the hydrogen water generator disclosed in Patent Literature 2, the anode plate and the cathode plate are arranged approximately horizontally in the beverage container so that the diameters of hydrogen gas bubbles are prevented from being enlarged through coalescing. Thus, the fall of hydrogen concentration is delayed.

However, in Patent Literature 2, since a beverage container having a special structure in which a conductive part is fixedly arranged from the anode plate and the cathode plate to the outside of the beverage container can be only used, there is inconvenience that the whole beverage container has to be carried for carrying.

In view of the above, an object of the present invention is to provide a hydrogen water generator capable of efficiently generating hydrogen with a structure in which an anode electrode and a cathode electrode are arranged in a container in an approximately vertical direction.

The present invention provides a hydrogen water generator including a beverage container capable of storing drinking water, an electrode portion including an anode electrode and a cathode electrode arranged in parallel approximately vertically in the beverage container, a supporting portion that supports the electrode portion, a battery that is stored in the supporting portion, and a controller that controls voltage to be applied to the electrode portion for a predetermined time, the voltage being obtained by boosting battery voltage supplied from the battery. Here, the electrode portion includes two or more of the anode electrodes or the cathode electrodes.

The electrode portion includes three of the electrodes while polarization of the electrode arranged at the center and polarization of the electrodes arranged at both ends are different.

In another embodiment, the electrode portion includes four of the electrodes being two of the anode electrodes and two of the cathode electrodes while the electrodes are arranged to form a square shape in plane view with the adjacent electrodes having polarization different to each other.

Further, in another embodiment, one of the electrodes is arranged at the center of four of the electrodes arranged to form a square shape in plane view while the electrodes having polarization being different from the electrode at the center are arranged at both ends of a diagonal line passing through the electrode at the center and the electrodes having polarization being the same as the electrode at the center are arranged at both ends of the other diagonal line.

In any embodiment of the above regarding arrangement of the electrodes of the electrode portion, the adjacent anode electrode and cathode electrode are arranged having a distance of 0.8 mm.

In addition, lifetime of the electrodes is uniformed by setting polarization of the electrodes structuring the electrode portion to be capable of being switched.

The controller controls energizing time to the electrode portion in accordance with a quantity of drinking water stored in the beverage container so that hydrogen concentration of generated hydrogen water can be kept constant.

The controller boosts voltage, for example, to 20 V and supplies constant current to the electrode portion. Owing to supplying constant current, electrolysis is maintained without being influenced by difference of water quality of drinking water stored in the beverage container.

Further, it is preferable, in view of portability, to include a cap portion which is structured detachable from the supporting portion and covers and protects the electrode portion as being joined to the supporting portion.

According to the present invention, since a plurality of energizing paths between anode electrode(s) and cathode electrode(s) are formed in drinking water by inserting an electrode portion including two or more of anode electrodes or cathode electrodes to the drinking water from an upper part, a large quantity of hydrogen water can be easily generated in a short time. Accordingly, hydrogen water can be retained over a long period of time.

BRIEF DESCRIPTION OF DRAWINGS

FIG. 8 is a graph showing measured values of hydrogen concentration in drinking water depending on the number of the electrodes.

DESCRIPTION OF EMBODIMENTS

In the following, a hydrogen water generator according to the present invention will be described with reference to the drawings.

Figure 1:
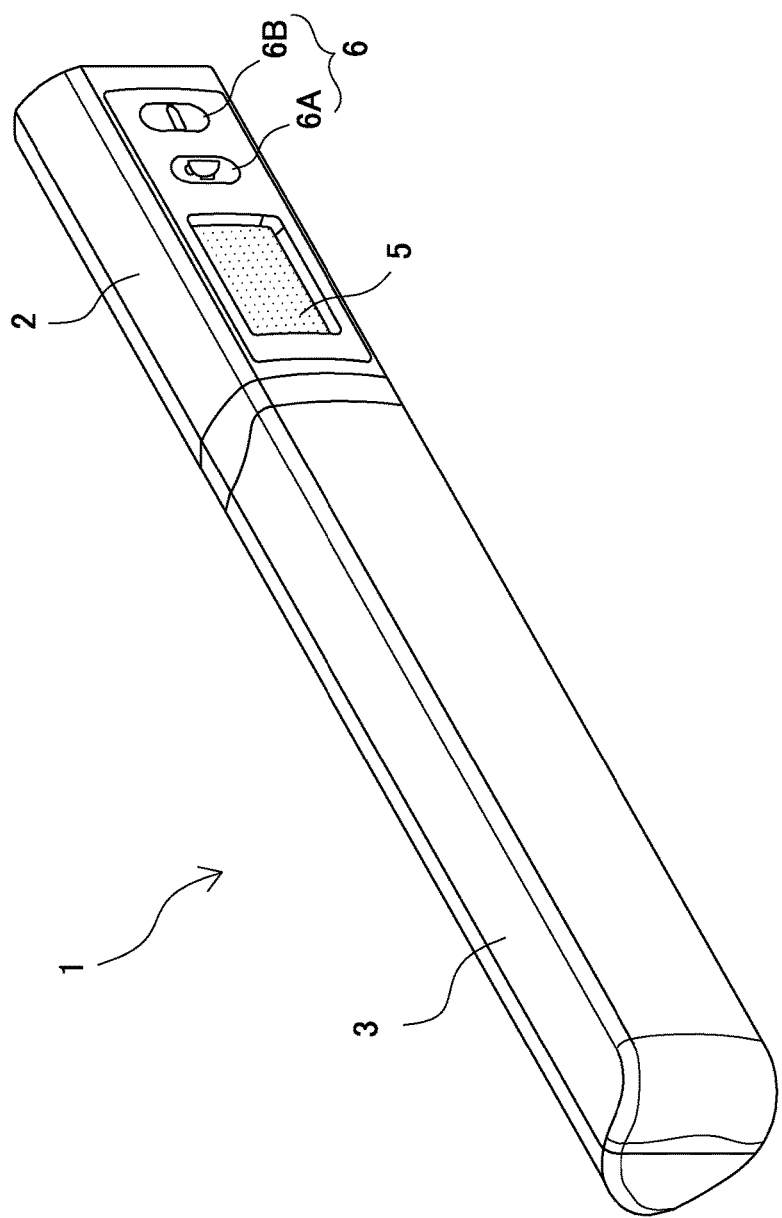
FIG. 1 is an external perspective view of a hydrogen water generator according to the present invention.
Figure 2:
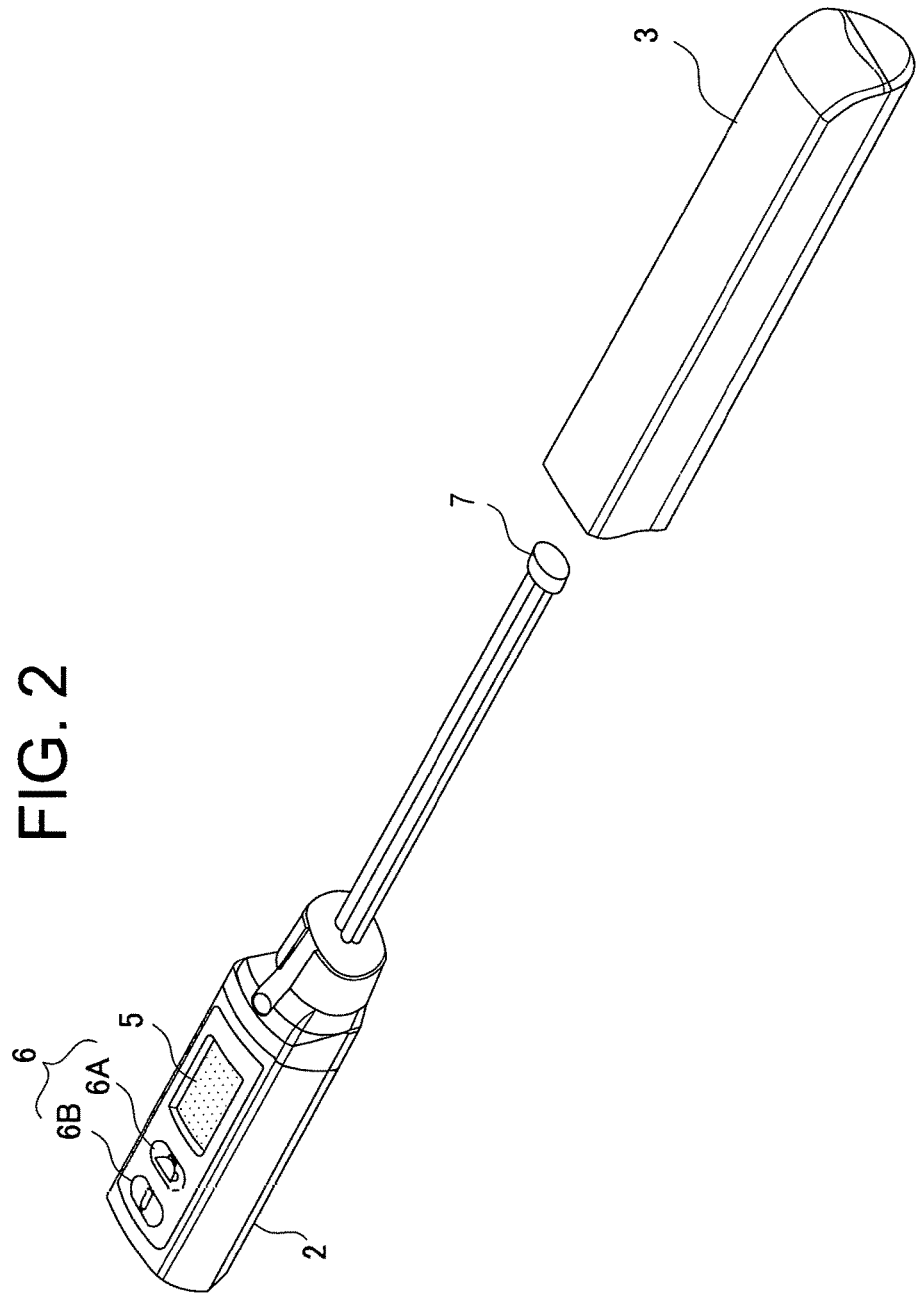
FIG. 2 is an exploded perspective view of the hydrogen water generator according to the present invention.

FIG. 1 is a whole perspective view of a hydrogen water generator 1 that includes a generator body cover portion 2 and a generator body cap portion 3. As illustrated in FIG. 2, the generator body cap portion 3 is detachable from the generator body cover portion 2. The generator body cap portion 3 covers and protects an electrode portion 4 formed as being protruded from the generator body cover portion 2 when mounted. Thus, the generator body cover portion 2 is a supporting portion which supports the electrode portion 4.

Figure 3:
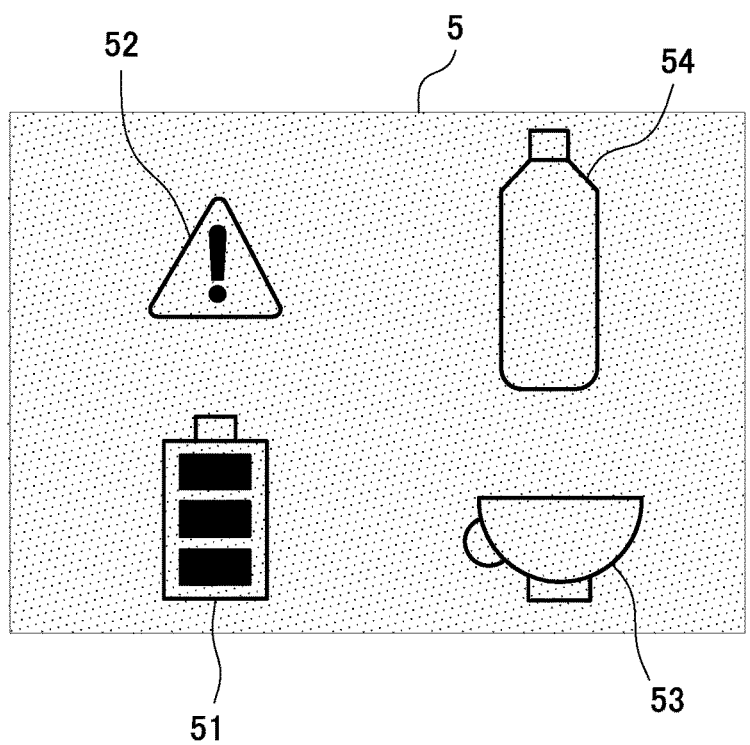
FIG. 3 is an explanatory view of a display portion of the hydrogen water generator according to the present invention.
Figure 4:
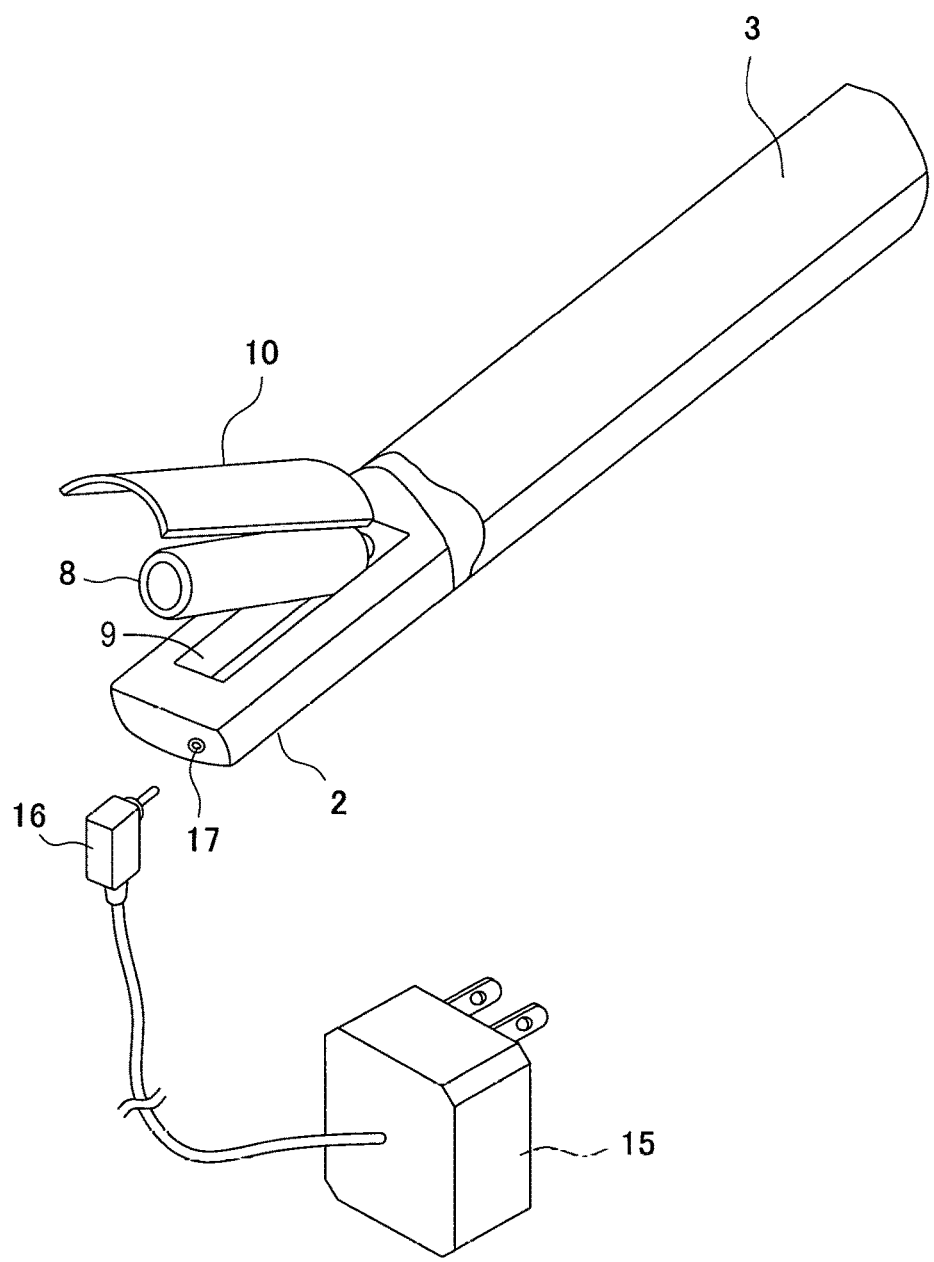
FIG. 4 is an external perspective view of the hydrogen water generator according to the present invention viewing from a back side.

A liquid crystal display portion 5 and a switch portion 6 which includes two types of generating switches 6A, 6B are arranged at a front face of the generator body cover portion 2. As illustrated in FIG. 3, the display portion 5 includes a battery remaining quantity displaying portion 51, a battery replacement displaying portion 52, and hydrogen water capacity displaying portions 53, 54. As illustrated in FIG. 4, a cover 10 of a battery box 9 which accommodates a battery 8 is formed at a back face of the generator body cover portion 2. The battery 8 may be a lithium ion battery being, for example, a 3.7 V AA-sized battery. The battery box 9 may be structured to accommodate two batteries 8 in series.

In FIG. 4, a structure of a power supply in which the battery 8 and a commercial power supply are used together is illustrated. A DC jack 17 to which a plug 16 of a AC adapter 15 which supplies DC power supply of 3.7 V or 7.4 V when connected to the commercial power supply is inserted is arranged at the generator body cover portion 2.

The electrode portion 4 includes four electrodes being two anode electrodes and two cathode electrodes. The four electrodes are arranged in parallel having an equal distance.

Figure 5:
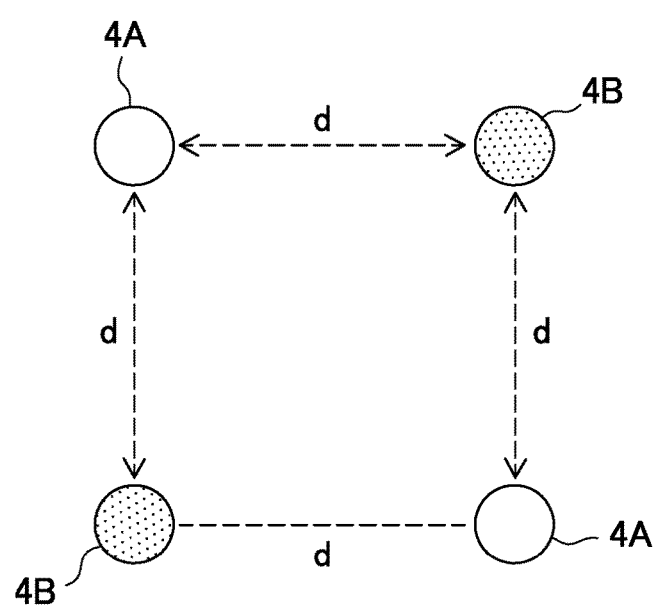
FIG. 5 is a schematic plane view of an arrangement of anode electrodes and cathode electrodes in the hydrogen water generator according to the present invention.

As illustrated in the plane view of FIG. 5, the electrodes may be arranged to form a square shape having a distance d of, for example, 0.8 mm. Accordingly, the anode electrodes 4A are arranged to be opposed to each other on one diagonal line of the square and the cathode electrodes 4B are arranged to be opposed to each other on the other diagonal line. The electrode portion 4 includes an electrode bar fixing protection cap 7 which bundles distal ends of the electrodes to prevent the electrodes from contacting to each other. In consideration of generation capacity of hydrogen and generation lifetime of the electrodes, it is preferable to use titanium, platinum, or composite material thereof for a material of the electrodes. However, magnesium and the like may be used as well. Gold plating may be performed on the surface of the electrodes.

Figure 6:
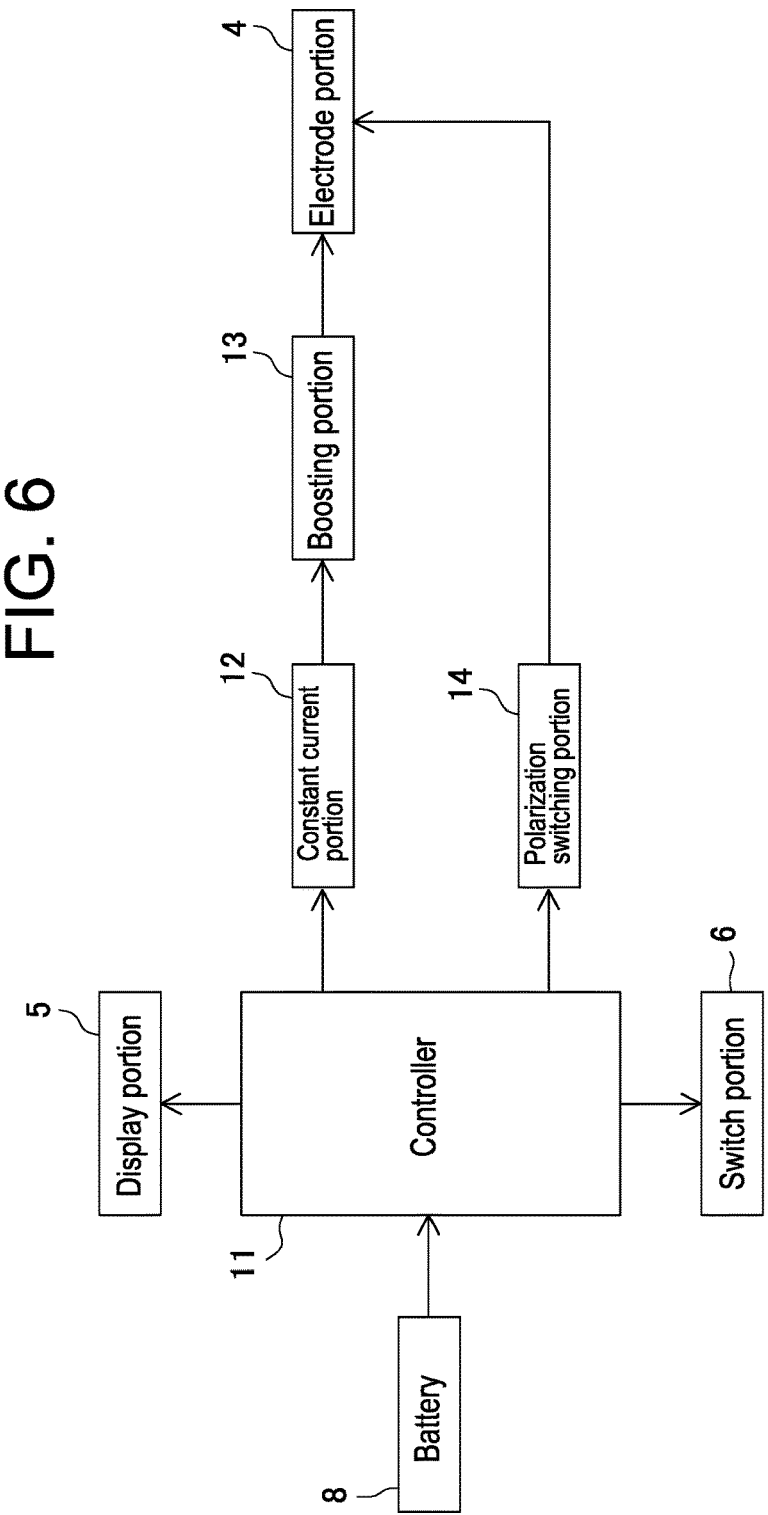
FIG. 6 is a block diagram illustrating an electrical configuration of the hydrogen water generator according to the present invention.

FIG. 6 is a block diagram illustrating an electrical configuration of the hydrogen water generator 1. The controller 11 is structured with an integrated circuit including a general central processing unit and the like. A battery voltage of 3.7 V is supplied to the controller 11 from the battery 8 or 7.4 V in a case that two batteries 8 are accommodated in series in the battery box. The controller 11 is connected to the display portion 5, the switch portion 6, a constant current portion 12, a boosting portion 13, and a polarization switching portion 14.

The controller 11 performs energizing control to the electrode portion 4 which is put into water to cause electrolysis when the generating switch 6A or 6B of the switch portion 6 is operated. At this time, the controller 11 varies energizing time in accordance with the operated generation switch 6A, 6B and controls the display of the hydrogen water capacity displaying portions 53, 54 of the display portion 5 corresponding to the operated switch.

Further, during energizing the electrode portion 4, the controller 11 performs constant current control in which the constant current portion 12 constantly supplies constant current to the electrode portion 4 so that constant electrolysis is maintained without being influenced by the difference of water quality where the electrode portion 4 is put in, in particular, without being influenced by water containing much salt. At this time, the boosting portion 13 boosts the battery voltage from 3.7 V or 7.4 V to 20 V and applies the boosted voltage to the electrode portion 4. Accordingly, it is preferable that the generator body cover portion 2 is made of resin material having heat resistance of at least 100 degrees.

In addition, the controller 11 has a function to display remaining quantity of the battery 8 in three levels on the battery remaining quantity displaying portion 51 through monitoring the remaining quantity of the battery 8, and a function to display a sign to urge electrode replacement on the electrode replacement displaying portion 52 when the number of times of energizing to the electrode portion 4 reaches a predetermined number such as 1000 times while counting the total number of times of energizing.

When energizing to the electrode portion 4 is performed to cause electrolysis, there occurs a phenomenon that metal material is slightly eluted out from the anode electrode 4A to the cathode electrode 4B. Then, the lifetime of the anode electrode is gradually shortened. Here, the electrodes of the electrode portion 4 are structured to be capable of being switched to anode or cathode, respectively. The controller 11 controls the polarization switching portion 14 to switch the polarization of the electrodes on a regular basis or each time electrolysis is started. Thus, the lifetime of the electrodes is uniformed.

Figure 7:
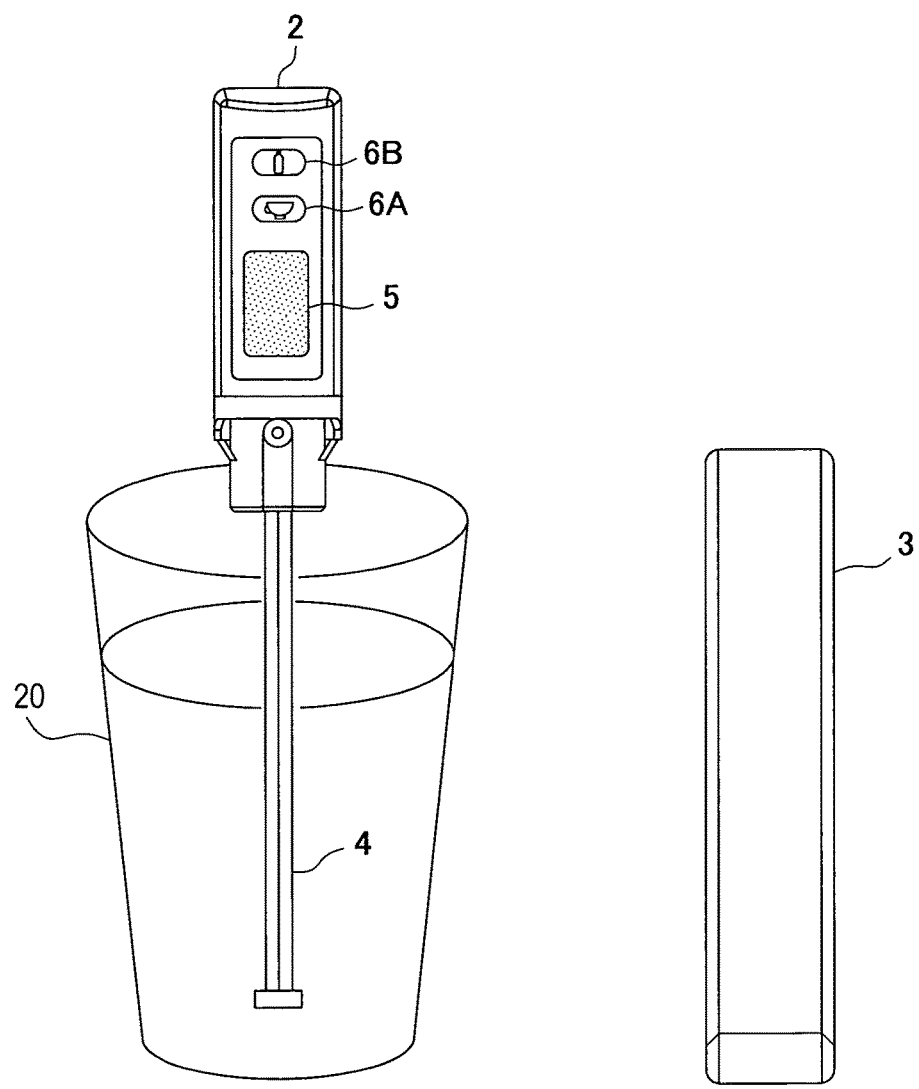
FIG. 7 is an explanatory view illustrating generation of hydrogen water using the hydrogen water generator according to the present invention.

Operation of the hydrogen water generator 1 with the above configuration will be described. To generate hydrogen water, it is required to detach the generator body cap portion 3, hold the generator body cover portion 2 supporting the electrode portion 4, and immerse the electrode portion 4 in drinking water in a beverage container 20 such as a cup, as illustrated in FIG. 7. Then, in accordance with the quantity of the drinking water in the beverage container 20, either the generating switch 6A or the generating switch 6B is operated. When the quantity of the drinking water is approximately between 400 ml and 500 ml, the generating switch 6B is to be operated. Then, the controller 11 drives the hydrogen water capacity displaying portion 54 and controls the voltage of 20 V boosted at the boosting portion 13 to be applied to the electrode portion 4 for 60 seconds. When the quantity of the drinking water is approximately between 200 ml and 250 ml, the generating switch 6A is to be operated. Then, the controller 11 drives the hydrogen water capacity displaying portion 53 and controls the voltage of 20 V to be applied to the electrode portion 4 for 30 seconds.

When voltage is applied to the electrode portion 4, electrolysis of the drinking water in the beverage container 20 is caused, so that the generated hydrogen ions are gathered to the cathode electrode 4B. The hydrogen ions gathered to the cathode electrode 4B receive electrons from the cathode electrode 4B, so that hydrogen atoms exist around the cathode electrode 4B. The hydrogen atoms bonded with each other become to hydrogen molecules and hydrogen water is generated.

With four electrodes being two anode electrodes 4A and two cathode electrodes 4B arranged, energization occurs between one cathode electrode 4B and two anode electrodes 4A through electrolysis. Accordingly, compared to the configuration in which two electrodes being one anode electrode 4A and one cathode electrode 4B are arranged, quantity of hydrogen in the drinking water can be increased as shown as the actual measured value of hydrogen concentration in FIG. 8. That is, since a plurality of energizing paths between the anode electrodes 4A and the cathode electrodes 4B are formed, hydrogen can be effectively generated in the drinking water.

Figure 9A:
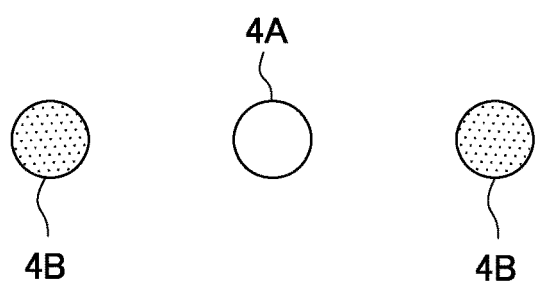
FIGS. 9A and 9B are schematic plane views of an arrangement of anode electrodes and cathode electrodes in the hydrogen water generator according to another embodiment of the present invention.

There are various configurations for forming a plurality of energizing paths between the anode electrode(s) and the cathode electrode(s) in the drinking water. As illustrated in FIG. 9A, the electrode portion 4 may be structured with three electrodes such that two cathode electrodes 4B are arranged at the right and left of one anode electrode 4A arranged at the center. In this case as well, as shown in FIG. 8, hydrogen concentration in the drinking water can be efficiently increased compared to a configuration in which two electrodes are arranged. When polarization of the electrodes is switched by the polarization switching portion 14 in this configuration, the electrode at the center becomes to the cathode electrode and the electrodes at both sides become to the anode electrodes. Other than arranging three electrodes in a line as illustrated, the electrodes may be arranged to form a triangular shape in plane view.

Figure 9B:
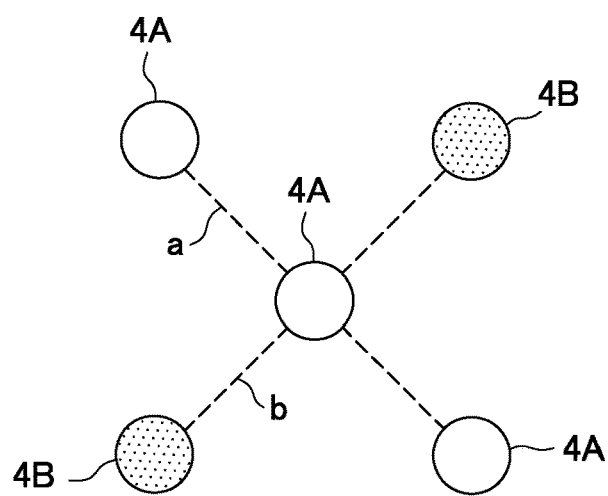

FIG. 9B illustrates an example of a structure of the electrode portion 4 in which five electrodes are arranged such that one electrode is arranged at the center of four electrodes arranged in a square shape in plane view. In FIG. 9B, the anode electrodes 4A are arranged at both ends of a diagonal line a passing through the anode electrode 4A at the center and the cathode electrodes 4B are arranged at both ends of the other diagonal line b. When polarization of the electrodes are switched by the polarization switching portion 14, the electrode at the center becomes to the cathode electrode B, the electrodes at both ends of the diagonal line a become to the cathode electrodes 4B, and the electrodes at both ends of the diagonal line b become to the anode electrodes 4A. Thus, the number of energizing paths between the anode electrode(s) and the cathode electrode(s) is further increased when the electrode portion 4 is structured with five electrodes as the above. Accordingly, hydrogen concentration in the drinking water can be further increased as shown as the actual measured value in FIG. 8.

Hydrogen can be efficiently generated as well by arranging the electrodes of the electrode portion 4 to be shaped to have large contact area with the drinking water. Accordingly, it is preferable that the electrodes are shaped to have larger surface area than a rod shape. Further, both of surface area and length can be ensured by forming the electrodes in a screw shape, so that generating efficiency can be improved.

Water such as tap water excepting distilled water is used as the drinking water in the beverage container 20 to cause electrolysis therethrough. It is preferable that mineral water containing mineral such as natrium, calcium, magnesium, and vanadium is used. Since mineral ions of the above are positive ions, the mineral ions are gathered to the cathode electrode 4B together with hydrogen ions when electrolysis is caused. As a result, hydrogen atoms and mineral atoms are bonded, so that vaporization of hydrogen can be prevented and hydrogen can be dissolved in the drinking water for a long term. In general, mineral water is commercially available in a plastic bottle. Here, long storage can be easily performed by closing a cap of the plastic bottle after causing electrolysis by inserting the electrode portion 4 through a mouth of the plastic bottle being the beverage container 20.

The present invention is not limited to the embodiments described above, and various modifications can be applied to the embodiments based on the spirit of the present invention. Modified examples are not excluded from the technical scope of the present invention.

INDUSTRIAL APPLICABILITY

The present invention relates to a hydrogen water generator capable of easily generating hydrogen water by generating hydrogen in water and is susceptible of industrial application.

REFERENCE SIGNS LIST

1 Hydrogen water generator
2 Generator body cover portion (supporting portion)
3 Generator body cap portion (cap portion)
4 Electrode portion
4A Anode electrode
4B Cathode electrode
8 Battery
11 Controller

The invention claimed is:
1. A hydrogen water generator comprising:
a beverage container for storing water;
an electrode portion including five electrodes having anode and cathode electrodes and being arranged in parallel approximately vertically in the beverage container, wherein one of the electrodes is arranged at a center of four of the electrodes arranged to form a square shape as viewed in a horizontal plane while the electrodes having polarization different from the electrode at the center are arranged at two ends of one diagonal line passing through the electrode at the center, and the electrodes having polarization same as the electrode at the center are arranged at two ends of another diagonal line passing through the electrode at the center;

a supporting portion that supports the electrode portion;

a battery that is stored in the supporting portion; and a controller that controls voltage to be applied to the electrode portion for a predetermined time, the voltage being obtained by boosting battery voltage supplied from the battery, wherein the controller mutually switches the polarization of the electrodes at the two ends of the one diagonal line, to be different from the polarization at the center and at two ends of the another diagonal line.

2. The hydrogen water generator according to claim 1, wherein the controller controls energizing time to the electrode portion in accordance with a quantity of drinking water stored in the beverage container.

3. The hydrogen water generator according to claim 1, wherein the controller performs controlling to boost the voltage to 20 V and to supply constant current to the electrode portion.

4. The hydrogen water generator according to claim 3, wherein adjacent anode and cathode electrodes are arranged in a distance of 0.8 mm.

5. The hydrogen water generator according to claim 1, further comprising a cap portion detachably attached to the supporting portion,
wherein the cap portion covers and protects the electrode portion as being joined to the supporting portion.

6. The hydrogen water generator according to claim 1, wherein each of the five electrodes is formed in a screw shape.

7. The hydrogen water generator according to claim 1, further comprising:

a first generating switch arranged on the supporting portion and operated to apply the voltage to the electrode portion to cause electrolysis for a first energizing time, a second generating switch arranged on the supporting portion and operated to apply the voltage to the electrode portion to cause the electrolysis for a second energizing time less than the first energizing time, and a display arranged on the supporting portion and including first and second hydrogen water capacity displaying portions, wherein when the beverage container stores the water equal to or more than a predetermined quantity and the electrode portion is immersed into the water of the beverage container, the first generating switch is operated to apply the voltage for the first energizing time and the display portion displays the first hydrogen water capacity displaying portion, and when the beverage container stores the water less than the predetermined quantity and the electrode portion is immersed into the water of the beverage container, the second generating switch is operated to apply the voltage for the second energizing time and the display portion displays the second hydrogen water capacity displaying portion.

8. The hydrogen water generator according to claim 7, wherein the electrodes at the two ends of the one diagonal line are the cathode electrodes, and the electrodes at the two ends of the another diagonal line and the electrode at the center are the anode electrodes, and the controller switches the cathode electrodes at the two ends of the one diagonal line to the anode electrodes, and mutually switches the anode electrodes at the two ends of the another diagonal line and the anode electrode at the center to the cathode electrodes.

* * * * *